United States Patent [19]

Mikituk

[11] 4,107,791
[45] Aug. 15, 1978

[54] LOCKING SYSTEM FOR BLENDER JAR OR THE LIKE

[75] Inventor: Murray M. Mikituk, Welland, Canada

[73] Assignee: General Signal Corporation, Rochester, N.Y.

[21] Appl. No.: 838,596

[22] Filed: Oct. 3, 1977

[51] Int. Cl.² .......................... B01F 13/04; B01F 7/16
[52] U.S. Cl. .................................. 366/205; 241/282.1
[58] Field of Search ............... 366/244, 245, 249, 251, 366/314, 205; 241/199.12, 282.1, 282.2

[56] References Cited

U.S. PATENT DOCUMENTS

| | | | |
|---|---|---|---|
| 3,550,657 | 12/1970 | Swanke | 366/314 |
| 3,713,628 | 1/1973 | Christensen | 366/314 |
| 3,786,999 | 1/1974 | Cabell | 366/205 |

Primary Examiner—Robert W. Jenkins
Attorney, Agent, or Firm—Milton E. Kleinman; John Ohlandt

[57] ABSTRACT

A locking system featuring a movable pin which is selectively operative to lock a blender jar into its holder when the entire jar assembly is positioned on a console or the like for performing a blending operation; otherwise the pin stays in an appropriate position such that the blender jar can be screwed into its holder without hindrance.

5 Claims, 7 Drawing Figures

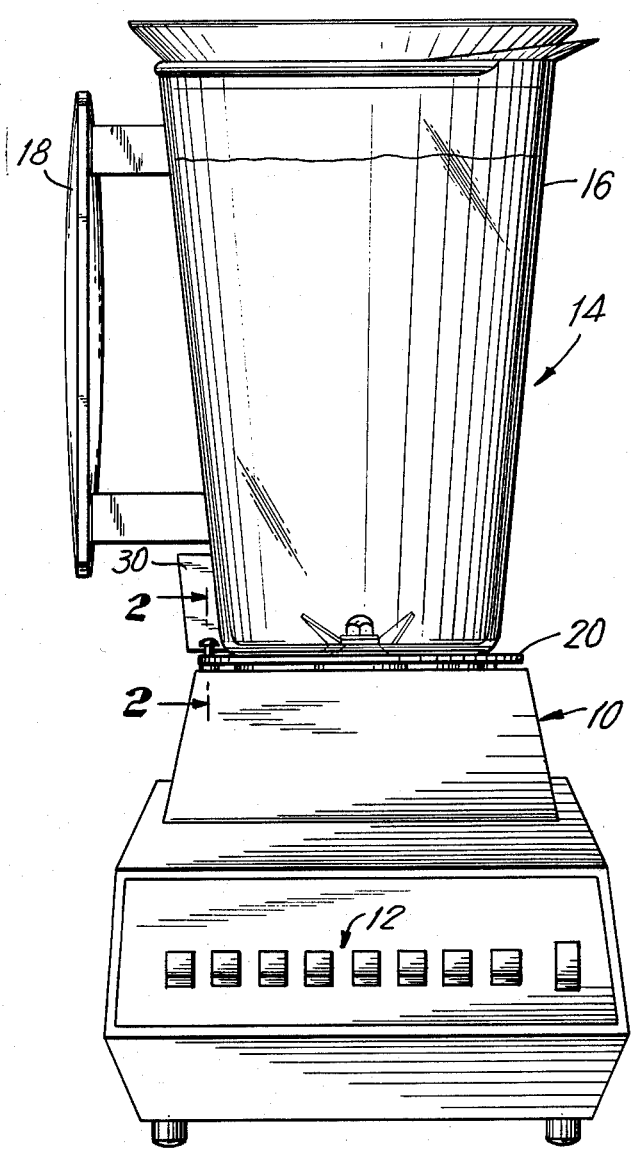
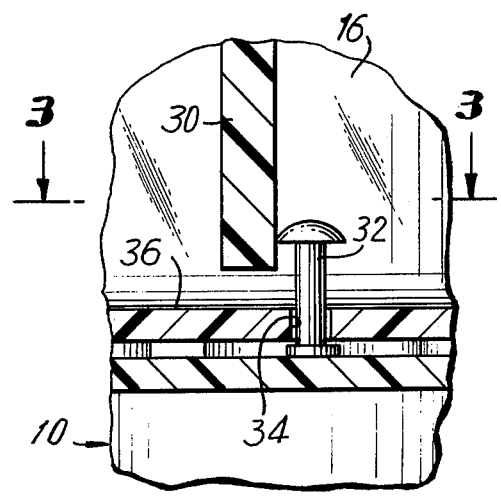
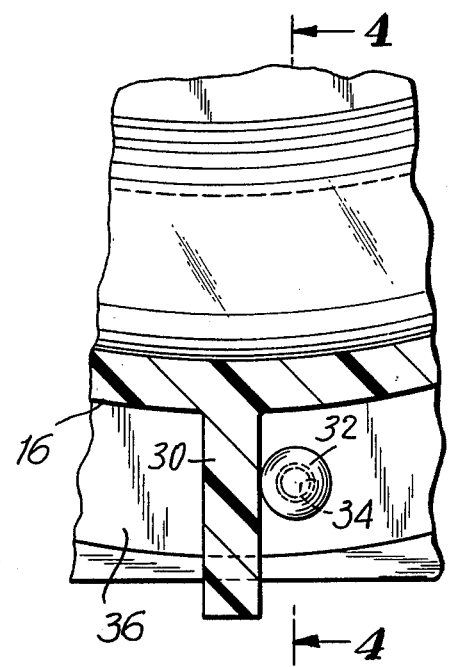

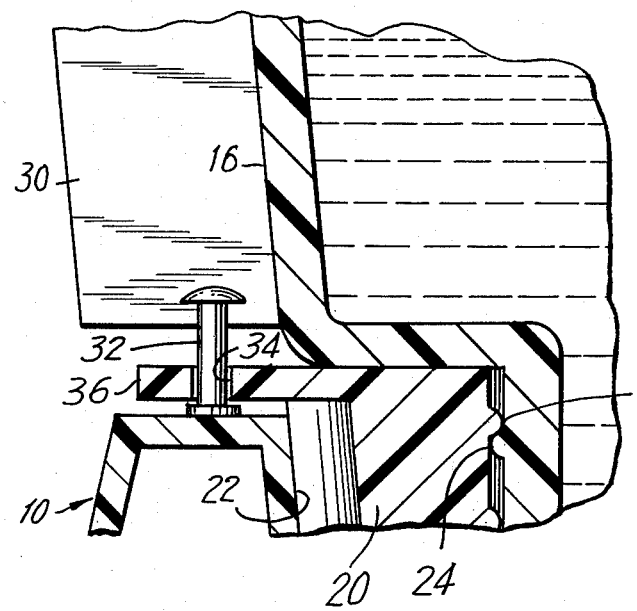
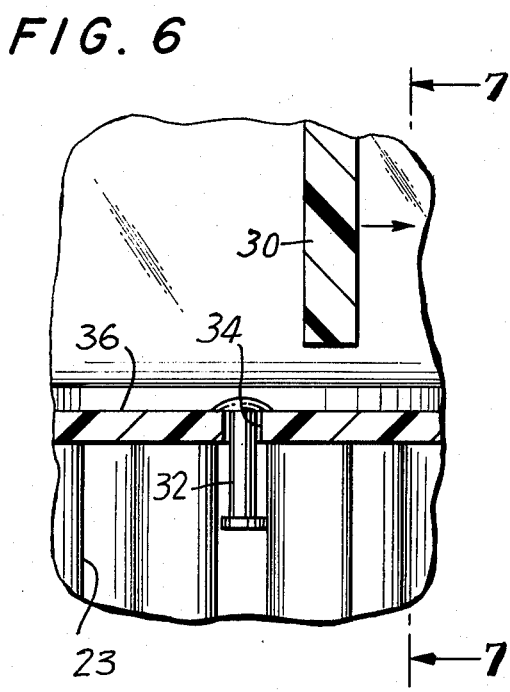
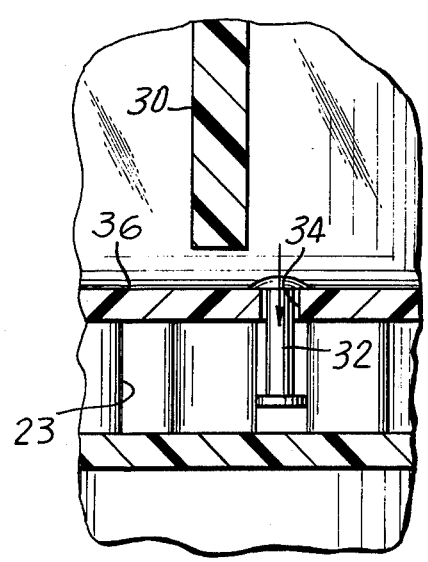
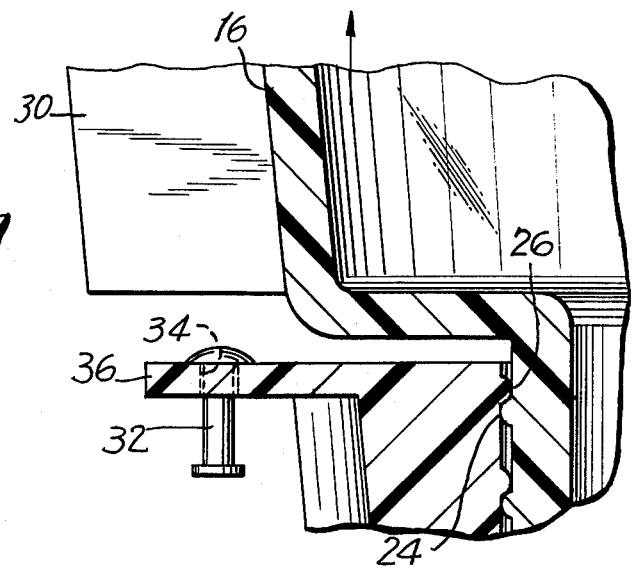

LOCKING SYSTEM FOR BLENDER JAR OR THE LIKE

BACKGROUND, OBJECTS AND SUMMARY OF THE INVENTION

This invention pertains to a locking system for a blending or blender device and particularly to a blender that involves a jar that is fitted into a holder to form a two-part blender assembly.

In the past twenty years or so, blenders have become extremely popular for use in the kitchen in order to thoroughly mix and blend ingredients in a jar. One of the earliest of these devices features a one-piece or unitary jar having the blades or impellers fixedly located in the bottom of the jar, the blades being connected through a sealing assembly to a suitable drive means in the base of the unit or machine.

Although the above-described blender devices have been efficient, it has become the practice, because of the cost factor and for greater ease in cleaning, to manufacture the blender in two separable parts, that is, to construct a separate blender jar having a handle or like element and to have a holder into which the blender jar is fitted; typically, the bottom of the blender jar is open and is provided with suitable threads that are engaged by corresponding threads in the holder, which thus functions as a "nut". With such an arrangement, the fact that the jar is open at the bottom means that it can be thoroughly cleaned or scrubbed; likewise, the holder or nut on which the impeller or blade assembly is fixed is thereby so arranged that the blades are easily available for cleaning. In other words, unlike the earlier model or version, it is no longer necessary to reach down to the bottom of the blender jar in order to clean the blades.

It has also become a common mode of connecting the jar assembly to provide the holder with fluted sides involving spaced slots which are located such that a number of them will mate positively with corresponding elongated upstanding rubber cushions that extend radially inwardly from a crater or recess provided in the base or console of the blender device. By such an arrangement the two-part jar assembly is prevented from rotating in the blender base. However, while such a locking arrangement is satisfactory from the standpoint of providing positive locking of the complete jar assembly, a problem has arisen in that it is necessary to positively prevent the jar itself from unscrewing off the hand-tightened threaded jar nut when the blender is in operation. In other words, if the consumer should fail to tighten the nut to the jar sufficiently, it could happen that the blades in acting against a heavy chunky mass in the blender jar, would cause the jar to unscrew from the nut and possibly spin off the nut, thereby exposing the bare blades to the consumer.

Because of the concern about possible danger to the consumer, it has been proposed by certain government bodies that a standard be imposed whereby the rotation of the blades on a blender shall not tend to loosen either the blades or the container.

Accordingly, the present invention is directed to overcoming the aforedescribed problem so as to satisfy any governmental standards on consumer safety in this respect.

It is therefore a primary object of the present invention to provide an extremely inexpensive locking system that will provide positive locking of a blender jar to the holder or nut which receives such jar so as to prevent the jar from unscrewing from the holder when the blender is in operation.

Another object is to insure that the simplified locking system will not interfere with normal joining together of the blender jar with its receiving holder or nut.

The above objects are fulfilled and implemented by a primary feature of the present invention according to which the blender jar is constructed to have a small flange member projecting radially outwardly near the bottom of the jar. The lower end of the flange member on the blender jar just clears the upper surface of a flange provided in the plastic holder or nut.

A hole is provided in the flange of the holder with adequate clearance such that a lengthy pin or rivet can freely move therein. Thus, when the jar and holder are assembled in the appropriate orientation, that is, are upright, the pin will drop down by its own weight such that there will be no significant protrusion above the holder flange. However, when the jar assembly is placed on its base or console, contact of the holder flange with the rim adjacent the recess in the base will cause the pin or rivet to be forced upwardly, thereby to prevent movement of the jar by reason of the pin's engagement with the projecting flange member at the bottom of the jar. Accordingly, the jar is prevented from unscrewing from the holder.

Because of the various degrees of tightening to which the blender jar would ordinarily be subjected in being placed in the assembled state, sufficient leeway is allowed between the location of the pin on the holder and the outwardly projecting flange on the jar such that it will be insured that in all cases the desired prevention of movement will be accomplished. Moreover, because of the leeway permitted, any partial loosening of the holder means that a slight leakage will occur so as to alert the consumer that there is a loose assembly. In other words, since the pin or rivet will not ordinarily interfere with the flange until there has been some loosening, a desirable warning is effectuated.

Other and further objects, advantages and features of the present invention will be understood by reference to the following specification in conjunction with the annexed drawing, wherein like parts have been given like numbers.

BRIEF DESCRIPTION OF THE DRAWING

FIG. 1 is a front elevation view of the complete blender device and illustrating the blender jar assembly mounted on a console or base which contains the driving motor and other equipment;

FIG. 2 is an enlarged sectional view, taken on the line 2—2 of FIG. 1, and particularly illustrating the blender jar locking system, including a movable pin on the jar holder and a flange member incorporated as part of the jar;

FIG. 3 is a sectional view taken on the line 3—3 of FIG. 2;

FIG. 4 is an enlarged sectional view taken on the line 4—4 of FIG. 3;

FIG. 5 is a sectional view, similar to the view in FIG. 2, but showing the situation whereby the locking pin moves into a downward position in the blender jar holder so as to permit rotation of the jar with respect to the holder;

FIG. 6 is another sectional view similar to FIG. 5, but showing the blender jar having freely moved past the locking pin;

FIG. 7 is another view illustrating the relationship of the locking system and the blender jar assembly when the latter is removed from the blender console, this view being similar to FIG. 4.

DESCRIPTION OF PREFERRED EMBODIMENT

Referring now to the figures of the drawing and particularly for the moment, to FIG. 1, there will be seen a complete blender device which includes a conventional blender base or console 10 housing the driving mechanism and the requisite control circuitry, including switches 12 seen on the front panel of the console 10.

The blender jar assembly 14 includes a blender jar 16, provided with a handle 18 which is joined to a conventional holder or nut 20. The entire jar assembly 14, including the holder or nut, is mounted or held on the base 10 by having the assembly 14 fitted snugly into a recess 22 (FIG. 4) formed in the base 10. Firm or snug fitting is accomplished by reason of fluted sides on the holder 20 which mate positively with three elongated upstanding rubber cushions located in the recess 22, such cushions extending radially inwardly to engage with spaced slots or openings 23 defining the fluted sides.

Although this snug engagement of the jar assembly 14 within the recess is generally satisfactory, a danger is presented because of the ability of the two parts of the jar assembly to come apart under operating conditions, these separable parts being normally joined in a non-operating or static state by reason of the arrangement of mating threads 24 and 26 on the blender jar 16 and holder 20, respectively.

Accordingly, to overcome the described problem and to positively prevent jar 16 from unscrewing from the hand-tightened holder 20, a locking system is provided in accordance with the present invention.

One part of the locking system comprises a small flange member 30 which is affixed or preferably integrally formed with the jar 16. The other part of the locking system comprises a pin or rivet 32 which is suitably flattened at either end and is suitably dimensioned to fit within a hole 34 formed in the holder 20. This hole 34 is situated in a flange-like portion 36 of the holder.

When the jar assembly 14 is positioned or placed in the recess 22 of the base 10, the flange 36 will be spaced only slightly from the upper surface adjacent the rim of the opening 22 (FIG. 4). Consequently, the pin 32 will be forced to move upwardly in such a way as to block movement of the flange member 30 when and if the jar 16 begins to rotate in a counterclockwise direction so as to tend to become unscrewed from its holder 20. This situation can be easily appreciated by reference particularly to FIGS. 2, 3 and 4. The pin 32 is so located on the circumference of the holder 20 that under conditions of normal tightening, that is to say, of normally screwing the jar and holder together with sufficient force, the flange member 30 on the jar will end up in a position beyond the pin, that is to say, as seen in FIG. 2 considerably to the left of the pin. In other words, sufficient clockwise rotation will have been imparted to carry the flange member to this position. Then, if the jar begins to unscrew or rotate in the opposite direction it will necessarily encounter the pin 32, as seen in FIG. 2.

Since the tightening of the jar with respect to the holder may differ in varying degrees, sufficient leeway must be allowed in locating the pin 32 on the peripheral flange 36. Thus the pin is located about a quarter of a turn away from the tightest possible relationship of jar and holder. This may mean permitting the escape of some of the contents in the event that the jar should begin to unscrew from the holder. However, this is not a significant problem and will in fact alert the user to the fact that some disengagement has taken place.

As will be understood, the locking arrangement of the present invention is selectively operative to produce the aforenoted locking when required. However, when the jar 16 is initially placed into its holder 20, the pin 32 drops down by gravity such that its head end is flush with the surface of flange 36 (FIG. 5). Therefore no hindrance by the pin to the movement of the flange portion 30 of the jar 16 is presented. Likewise, in unscrewing the jar from its holder when the two parts have been removed from the recess 22, as may be appreciated from FIGS. 6 and 7, the pin 32 is completely out of the way and offers no interference.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. In a blender device having a blender jar assembly, which includes a blender jar engaged in a holder, adapted to be mounted on a base or console, the improvement of a locking system for preventing the jar from disengaging from its holder during blender operation, comprising a flange member near the bottom of said jar, and an elongated locking pin held loosely in a opening in said holder such that, in the normal upright orientation for the jar assembly, the pin drops down so that the jar is free to rotate in either direction in its holder, but when the assembly is placed on the base or console, said pin is forced upwardly by the base and thereby acts as a barrier to the flange member so as to prevent rotation of said jar.

2. A locking system as defined in claim 1, in which said flange member is integrally formed with the jar.

3. A locking system as defined in claim 1, in which a horizontal surface is provided for the base adjacent the rim of a recess or crater formed in said base, the recess being provided for receiving said blender jar assembly, and further comprising a flange on said blender jar holder in closely spaced relationship to said horizontal surface of the base when said blender jar assembly is received in said recess, whereby said pin is forced upwardly to serve as a barrier to prevent movement of the flange member on said jar.

4. A locking system as defined in claim 3, in which the blender jar is provided with threads at its base and the holder is provided with mating threads.

5. A locking system as defined in claim 4, in which the locking pin is so located in the flange on the holder that a firm tightening of the jar within the holder positions the flange member on the jar approximately a quarter turn beyond the pin.

* * * * *